US012791750B2

(12) United States Patent
Manuaba et al.

(10) Patent No.: US 12,791,750 B2
(45) Date of Patent: Nov. 10, 2026

(54) WELLBORE FLUID SATURATION MAPPING

(71) Applicant: Saudi Arabian Oil Company, Dhahran (SA)

(72) Inventors: Ida Bagus Gede Hermawan Manuaba, Dhahran (SA); Mohammad Kadhem Aljishi, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/648,596

(22) Filed: Apr. 29, 2024

(65) Prior Publication Data

US 2025/0334712 A1 Oct. 30, 2025

(51) Int. Cl.

| | |
|---|---|
| ***G01V 3/20*** | (2006.01) |
| ***E21B 7/04*** | (2006.01) |
| ***E21B 44/00*** | (2006.01) |
| ***E21B 49/00*** | (2006.01) |
| ***G01V 20/00*** | (2024.01) |

(52) U.S. Cl.

CPC .................. *G01V 3/20* (2013.01); *E21B 7/04* (2013.01); *E21B 44/00* (2013.01); *E21B 49/00* (2013.01); *G01V 20/00* (2024.01); *E21B 2200/20* (2020.05)

(58) Field of Classification Search

CPC .. E21B 47/0228; E21B 47/047; E21B 47/113; E21B 2200/20; G01V 3/38

See application file for complete search history.

(56) References Cited

U.S. PATENT DOCUMENTS

| | | | | |
|---|---|---|---|---|
| 10,802,177 B2 | 10/2020 | Wessling et al. | | |
| 2003/0182093 A1* | 9/2003 | Jones | E21B 49/00 | 703/11 |
| 2009/0229882 A1* | 9/2009 | Quernheim | E21B 44/00 | 175/45 |

(Continued)

FOREIGN PATENT DOCUMENTS

EP 3452697 B1 12/2023

OTHER PUBLICATIONS

Davies et al., "Azimuthal Resistivity Imaging: A New-Generation Laterolog," SPE Formation Evaluation, Sep. 1994, 9(03):165-174, 10 pages.

(Continued)

*Primary Examiner* — Cathleen R Hutchins

(74) *Attorney, Agent, or Firm* — Fish & Richardson P.C.

(57) ABSTRACT

Example methods and systems for wellbore fluid saturation mapping are disclosed. One example method includes obtaining, from a resistivity logging tool and during a process of drilling a wellbore in a reservoir formation, resistivity data of the reservoir formation in a first multiple azimuthal directions. Fluid saturation of the reservoir formation in the first multiple azimuthal directions is determined based on the resistivity data. A three-dimensional (3D) model of fluid saturation around the wellbore is determined based on the fluid saturation of the reservoir formation in the first multiple azimuthal directions. One or more steering commands for steering a drill bit during the process of drilling the wellbore is generated based on the 3D model of fluid saturation around the wellbore. A downhole drilling assembly is steered during the process of drilling the wellbore, based on the one or more steering commands.

20 Claims, 4 Drawing Sheets

(56) References Cited

U.S. PATENT DOCUMENTS

| | | | | |
|---|---|---|---|---|
| 2013/0282289 | A1 | 10/2013 | Lotfy et al. | |
| 2017/0103144 | A1* | 4/2017 | Badri | G01V 1/302 |
| 2017/0145804 | A1* | 5/2017 | Wessling | G06Q 10/0631 |
| 2017/0254924 | A1* | 9/2017 | Nikitenko | G01V 3/28 |
| 2022/0082014 | A1* | 3/2022 | Hou | E21B 47/12 |
| 2022/0146704 | A1* | 5/2022 | Stalheim | G01V 3/30 |

OTHER PUBLICATIONS

Manuaba et al., "Taking Petrophysics to New Horizons—Far Field Saturation and Lithology in Clastic Reservoirs," presented at the International Petroleum Technology Conference, Bangkok, Thailand, Mar. 1-3, 2023, 13 pages.

International Search Report and Written Opinion in International Appln. No. PCT/US2025/025901, mailed on Jul. 17, 2025, 14 pages.

* cited by examiner

WELLBORE FLUID SATURATION MAPPING

TECHNICAL FIELD

The present disclosure relates to computer-implemented methods and systems for wellbore fluid saturation mapping.

BACKGROUND

Steering drill bits in thin and laminated reservoirs during a wellbore drilling process is a challenging task in the oil and gas industry. Steering drill bits in a reservoir with variable hydrocarbon-water contact is also challenging, especially when the hydrocarbon-water contact is close to the roof and/or the seal of the reservoir, given the changing fluid saturation distribution and/or changing rock qualities around the wellbore while the wellbore is being drilled.

SUMMARY

The present disclosure involves methods and systems for wellbore fluid saturation mapping. One example method includes obtaining, from a resistivity logging tool and during a process of drilling a wellbore in a reservoir formation, resistivity data of the reservoir formation in a first multiple azimuthal directions. Fluid saturation of the reservoir formation in the first multiple azimuthal directions is determined based on the resistivity data. A three-dimensional (3D) model of fluid saturation around the wellbore is determined based on the fluid saturation of the reservoir formation in the first multiple azimuthal directions. One or more steering commands for steering a drill bit during the process of drilling the wellbore is generated based on the 3D model of fluid saturation around the wellbore. A downhole drilling assembly is steered during the process of drilling the wellbore, based on the one or more steering commands.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, obtaining the resistivity data includes obtaining the resistivity data and at least one of density data of the reservoir formation in a second multiple azimuthal directions, photoelectric (PE) factor data of the reservoir formation in a third multiple azimuthal directions, gamma ray (GR) data of the reservoir formation in a fourth multiple azimuthal directions, or porosity indicator data of the reservoir formation converted from total neutron count.

In some implementations, determining the fluid saturation of the reservoir formation in the first multiple azimuthal directions includes determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first multiple azimuthal directions.

In some implementations, determining lithology and porosity of the reservoir formation includes determining, based on at least one of multiple density-neutron cross-plots, multiple volume of shale equations, or multiple fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

In some implementations, determining the fluid saturation of the reservoir formation in the first multiple azimuthal directions includes performing a geostatistical interpolation processing on the fluid saturation to transform the fluid saturation from one dimension to two dimensions.

In some implementations, the resistivity data is with respect to multiple depths of investigation (DOI).

In some implementations, obtaining the resistivity data includes obtaining the resistivity data through a high-bandwidth data transmission medium, where a bandwidth of the high-bandwidth data transmission medium is at least 56k bits per second.

In some implementations, steering the downhole drilling assembly includes sending the one or more steering commands to the downhole drilling assembly to steer the downhole drilling assembly.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

One existing technology for determining wellbore fluid distribution in real time during a wellbore drilling process is the use of mud pulses acquired from a downhole system. However, the noise associated with collected mud pulses can mask fine details of wellbore fluid distribution and/or misshape the wellbore fluid distribution.

This disclosure describes systems and methods for developing a real time wellbore fluid saturation mapping model through integration of various logs at different depths of investigation. The developed real time wellbore fluid saturation mapping model can enable well steerers to direct the drilling of a wellbore to a zone of interest in a reservoir in real time based on the real time wellbore fluid saturation mapping model representing around the wellbore being drilled. In some cases, the disclosed systems can be surface-based, integrating detailed outputs from common logging tools (e.g., logging tools for acquiring density, gamma ray, photoelectric factor, and/or resistivity data associated with reservoir formation) along with modeling techniques to produce a real time wellbore model of fluid distribution and/or lithological changes of reservoir formation where a wellbore is being drilled. The wellbore model can enable the generation of well drilling commands that can be sent to the downhole drilling assembly for drilling the wellbore in real time. The disclosed methods can provide a cost-effective way for well steering by identifying fluid changing direction and/or rock quality variability in the reservoir formation where the wellbore is being drilled, and ultimately leading to higher hydrocarbon-water contact.

The disclosed systems and methods provide many advantages over existing systems. As an example, the disclosed methods can enable effective well steering by taking into consideration both fluid distribution and rock properties of a reservoir formation around a wellbore being drilled, for example, when placing horizontal wells in reservoirs. As another example, the disclosed methods can reduce human intervention in the entire well steering operation. Furthermore, a net to gross ratio in thin and laminated reservoirs can be improved. Additionally, the disclosed methods can enable three-dimensional (3D) geosteering mode that can reduce human errors during drilling operations, because multiple parameters and results associated with the drilling operations can be introduced automatically.

Figure 1:
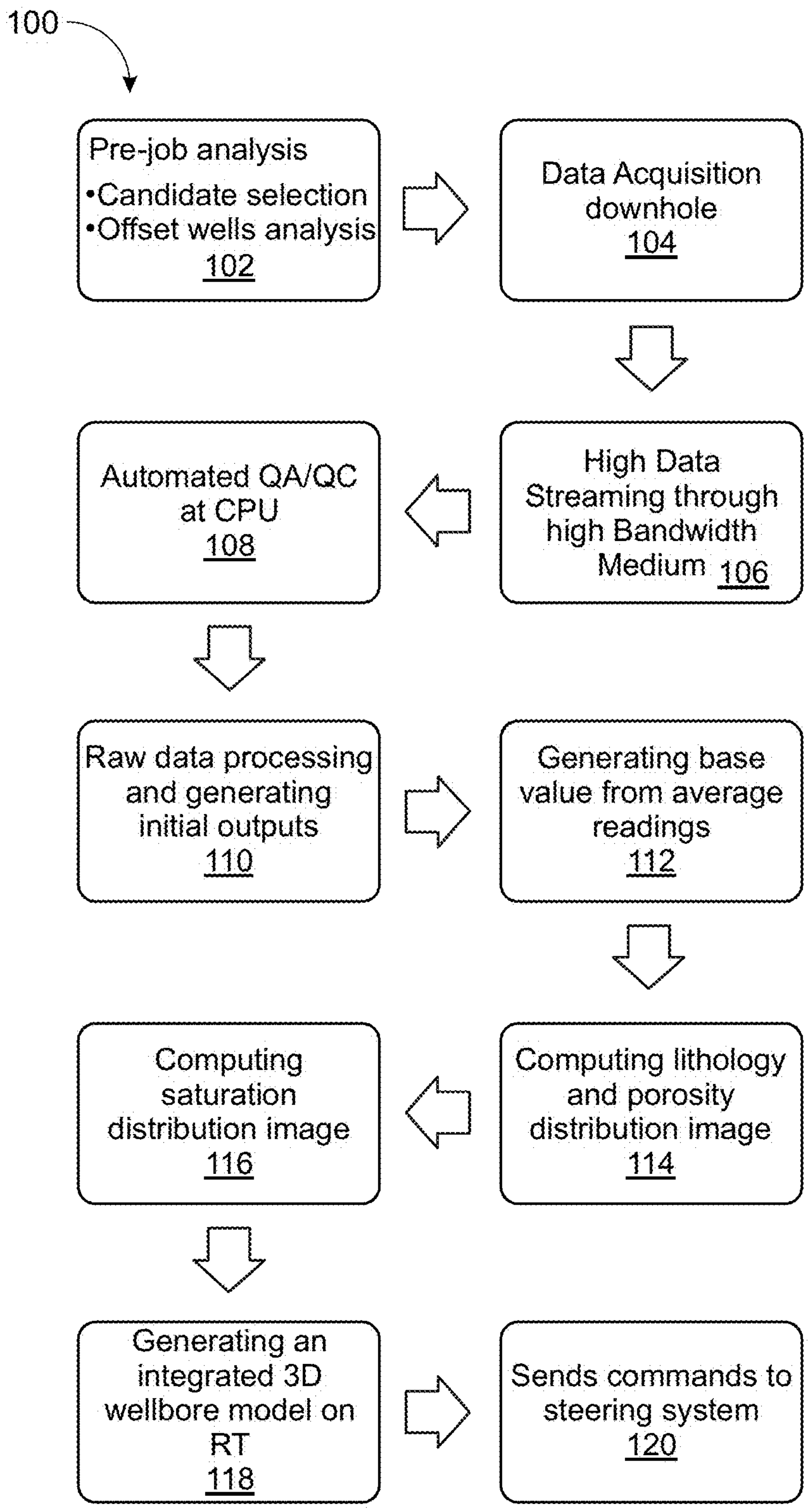
FIG. 1 illustrates an example process of determining wellbore fluid saturation distribution for well steering, according to some implementations.

FIG. 1 illustrates an example process 100 of determining wellbore fluid saturation distribution for well steering, according to some implementations. For convenience, process 100 will be described as being performed by a computer system having one or more computers located in one or more locations and programmed appropriately in accordance with this specification. An example of the computer system is the computer system 300 illustrated in FIG. 3. In some implementations, one or more operations in process 100 can be performed by reservoir formation evaluation software such as Geolog® or Techlog®.

At 102, a computer system performs pre-job analysis for well placement operations. In some implementations, the pre-job analysis can include selection of candidate areas for well placement operations, offset well analysis, drilling environment analysis, and/or fluid property utilization analysis. In some cases, candidate areas can be selected to be in mature fields or in new fields with limited offset data sets. Wells can be drilled with conductive mud system (e.g., water-based mud) to ensure that resistivity tools can provide results with three to four different layers of depths of investigation (DOI). Additionally, time for resistivity sensors to reach a measured depth (MD) after drilling bit first reaches that MD (e.g., time exposure after bit) can be up to two hours. In some cases, the pre-job analysis takes into account logging tool responses to different resistivity, density, photoelectric (PE), and Gamma-ray (GR) of formation fluid (conductive and/or non-conductive), drilling fluids, and/or matrix. For example, the pre-job analysis can take into account the downhole drilling sensor tool response to drilling fluid and/or mud.

At 104, once a process of drilling a wellbore starts, the computer system powers up logging tools to acquire data, for example, GR, density, PE, and/or laterolog resistivity data of reservoir formation where the wellbore is being drilled in real time. A laterolog is a resistivity log that contains data related to the electrical resistivity of a geological formation. In some cases, the data in the laterolog can be acquired from a resistivity tool that injects electric currents into geological formations and records the potential drop across a specific length along a well.

At 106, the computer system receives the data acquired by the logging tools at 104 through a high-bandwidth medium. An example of the high-bandwidth medium is wired drill pipe, which can be used as a medium for high-bandwidth telemetry, for example, with 56,000 bits/second bandwidth compared with low-bandwidth of 2 to 10 bits/second and medium-bandwidth between 10 to 100 bits/second. An example bandwidth of the high-bandwidth medium is 56,000 bits/second or higher. The high-bandwidth capacity can allow for downhole-quality data to be retrieved by the computer system, without the noise related to mud pulses, which can misshape the data and mask fine details of the data. Furthermore, the high-bandwidth capacity can eliminate the data volume transfer limitation associated with mud pulses and allow the detailed binning data, e.g., GR, density, PE, and/or laterolog resistivity, to be sent to the computer system from the different sensors in the logging tools in real time.

At 108, the computer system performs automated quality assurance (QA) and quality control (QC) on the data received at 106, based on logging procedures and standards. In some implementations, the computer system can be linked to the database of an operator. In some cases, the link to the database can be provided by gateway data transmission from a rig site that is actively drilling a well to the database. According to location information of offset wells, offset wells data can be used for quality check and to alert the operator. In some cases, the location information of offset wells in a field can be obtained using latitude and longitude coordinate system. For example, Universal Transverse Mercator (UTM) can be used as a location coordinate system in oilfield. Furthermore, different statistical measures can be used to check the repeatability and accuracy of the data as per the oil and gas industry standards. In some cases, repeat section logging can be used to re-log certain sections of a well after drilling, along the well and in specific measured depth intervals, for example, in intervals between 200 to 250 feet. Repeat section logging can be used to confirm that the repeatability and/or accuracy of main log and/or drilling log measurement responses are within predetermined tolerance.

At 110, the computer system generates initial output data. In some implementations, the initial output data can include at least one of: (1) multiple (e.g., 16 or more) azimuthal density curves divided around the wellbore, for example, every 22.5 degrees for 16 azimuthal density curves; (2) multiple (e.g., 16 or more) azimuthal photoelectric factor curves divided around the wellbore, for example, every 22.5 degrees for 16 azimuthal photoelectric factor curves; (3) multiple (e.g., 16 or more) near-bit azimuthal GR curves divided around the wellbore, for example, every 22.5 degrees for 16 near-bit azimuthal GR curves; (4) multiple (e.g., 64 or more) azimuthal resistivity curves computed from conductivity with various depths of investigation (DOI) depending on the contrast between the formation, fluid bared, and mud properties. Example azimuthal resistivity curves can include: (a) multiple (e.g., 16 or more) resistivity with a shallow depth of investigation and an average DOI of around 2 inches; (b) multiple (e.g., 16 or more) resistivity, medium depth of investigation, and an average DOI of around 4 inches; (c) multiple (e.g., 16 or more) resistivity with a deep depth of investigation and an average DOI of around 6 inches; and (d) multiple (e.g., 16 or more) resistivity with an extra-deep depth of investigation and an average DOI of around 9 inches; and (5) one porosity indicator curve converted from total neutron count.

In some implementations, to obtain conductivity data using a tool, the tool electrode can inject a current with constant voltage into a formation, passing through mud system, rock matrix, and formation fluid in pore space of the formation. The tool can have multiple electrodes, for example, three or four electrodes, with different positions (also referred to as spacing). The spacing between electrodes can lead to different responses from each depth of investigation, because the current from each electrode can go through a different path in the formation containing the formation fluid. Current that is injected into the formation can return to a receiver inside the tool. The return current can be affected by the contrast between mud resistivity and formation resistivity, as well as the types of formation fluid in the pore space.

In some implementations, a neutron tool can provide porosity measurement of a formation. A nuclear device in the neutron tool can measure thermalized energy level returned to the tool. The tool can send signals with high energy level from a radioactive source, for example, AmBe-241, to the formation. Energy level in the signals can be reduced after the signals collide with hydrogen atoms that reside in water ($H_2O$) and hydrocarbon (HCn). A receiver in the tool can detect energy returned from the formation. In some cases, a decreased level of returned energy can indicate an increased number of hydrogen atoms in the formation. The increased number of hydrogen atoms can correlate with an increase of rock porosity. Because the energy returned to the tool can came from all azimuthal directions of the formation, one porosity value can be generated as the whole porosity of the formation at a measured depth of investigation.

At 112, the computer system generates respectively base values of density, PE, neutron, GR, and resistivity from the average values of density, PE, neutron, GR, and resistivity curves obtained at 110. In some implementations, a single value from each sensor, for example, GR, density, neutron, PE, or resistivity sensor, can be generated to calculate a base line water saturation. The single value from each sensor does not indicate any orientation or direction from the wellbore. The single value from each sensor taken at each measured depth can be a value averaged over signals returned to a receiver of each sensor from different directions around the formation.

At 114, the computer system determines lithology and porosity based on the initial output data from 110, for example, the multiple segments (e.g., sixteen segments) of azimuthal density curves and GR curves, the porosity indicator curve converted from total neutron count, and the multiple segments (e.g., sixteen segments) of azimuthal photoelectric factor curves. In some implementations, depending on the offset well analysis, lithology, number of logs obtained, and control over the expected reservoir information, the computer system can solve for porosity, lithology, and fluid distribution either deterministically through density-neutron cross-plots, volume of shale equations, and/or fluid saturation equations (e.g., Archie, dual-water, Indonesian, etc.), or stochastically through the utilization of statistical models, for example, multi-mineral analysis utilizing average density, PE, neutron, and medium resistivity as base values of the corresponding data, to estimate minerals that penetrate the reservoir formation to produce lithology and/or porosity.

In some implementations, the aforementioned deterministic and stochastic approaches can be performed based on density-neutron cross-plots. In some cases, the deterministic approach can use density-neutron cross-plots to provide porosity and lithology readings from a combination of density log and neutron porosity. The density-neutron cross-plots generated by a tool can depend on the tool design (including tool size), tool characterization, tool calibration and/or tool environment correction. In some cases, the stochastic approach can predict and reconstruct matrix rock and pore space of a formation based on basic logging data such as gamma-ray log, density log, neutron log, and/or resistivity log. In some cases, both the deterministic and stochastic approaches can generate 3D images to aid 3D geosteering, based on logging measurements from different sectors (e.g., 16 sector/bin) and different depths of investigation of resistivity curves.

In some implementations, offset wells analysis can be used as quality control of real-time data acquisition. Readings from more sensors can lead to more accurate well analysis. For example, a density image or micro resistivity image, as part of real-time measurement, can provide information about the behavior of reservoir rock and fluid dynamic.

In some implementations, the computer system performs geostatistical interpolation processing (e.g., using Kriging) to transform the unidimensional lithology and/or porosity data to corresponding dual-dimensional data, for example, from scalar curves to an array, applying a pre-determined color map to show the changes in lithology and porosity. The lithology and porosity images can be integrated to represent porosity and change in lithology on a single track. In some cases, the porosity images can be on a single track with changing lithology based on multiple sectors/bin of density log and PE measurements. Lithology and porosity can be determined in 3D based on density-neutron cross-plots. Changes in density log values within the same bin of PE measurements can lead to different values of calculated lithology and/or porosity. Water saturation map in 3D with different depths of investigation can be generated from different resistivity responses that can create multiple layers of water saturation with different distances from the wellbore. Kriging method can be used to interpolate between different layers of water saturation.

At 116, the computer system determines fluid saturation (e.g., water saturation) multiple times (e.g., four times at each of the multiple azimuthal readings) utilizing the fluid saturation equations (e.g., Archie, dual-water, or Indonesian). In some implementations, the computer system can determine fluid saturation (e.g., water saturation) using an Archie equation or a simplified Archie equation, for example, using Equation 1 below.

$$S_w = \sqrt[n]{\frac{aR_w}{\phi^m R_t}} \tag{1}$$

where $S_w$ is the fluid saturation, a is the empirical constant, $R_w$ is the resistivity of the formation fluid (in Ω-m), ϕ is porosity, m is cementation exponent, and $R_t$ is the resistivity of uninvaded formation (in Ω-m).

In some implementations, the computer system performs a geostatistical interpolation processing (e.g., Kriging) to transform the unidimensional fluid saturation data to dual-dimensional data at each depth of investigation, resulting in multiple (e.g., four) saturation images. In some cases, because different depths of investigation from a resistivity tool can produce multiple curves, multiple layers of water saturation curves in 3D can be created with one layer. Adding another layer can add thickness of water saturation away from the wellbore. The added layer can create the additional dimension in the dual-dimensional data at each depth of investigation.

At 118, the computer system utilizes a combination of discrete models and geostatistical techniques to determine fluid changes between the four different depths of investigation described at 110, utilizing the multiple (e.g., four) saturation images along with the lithology image, and therefore generates a three-dimensional model of the wellbore showing pore and fluid distribution across the wellbore and around the wellbore, with a depth of investigation of a number of inches (e.g., around 9 inches) in real time. In some implementations, multi-layer depth of investigation (DOI) provided by the logging tools in multiple (e.g., 16) azimuthal bins can correspond with the response of resistivity while drilling with respect to DOI in the multiple bins that affect fluid saturation image profile gradation. In some cases, the discrete models can be based on multiple quantities, for example, density-neutron cross-plots from tools with different tool sizes, multiple bins/sector from density log and PE log, single value of neutron porosity, multiple (e.g., 3 to 4) depths of investigation of resistivity curves, constant a, m, and n values, and/or constant formation water salinity (also referred to as $R_w$). In some cases, the geostatistical technique can include the Kriging method for interpolation of water saturation between layers.

At 120, based on the results of the three-dimensional model, the computer system further generates a command to the steering system in the downhole assembly with a distinctive order to follow an interval. In some implementations, the computer system can be linked to an automated well steerer, for example, an automated computing system (e.g., using artificial intelligence or machine-learning). An example of the automated computing system is a categorical supervised classification system. After the automated computing system performs petrophysical interpretation, the interpretation results are passed through the three-dimensional model from 118 to generate the command based on the wells objective inputted by a user. In some implementations, the user can be a human well steerer and can interact with the computer system to generate the command to direct the drilling of the wellbore to a zone of interest in a reservoir in real time, based on the three-dimensional model from 118 that represents fluid distribution and formation properties across and around the wellbore being drilled. In some cases, petrophysical interpretation can be performed based on parameters that are related to the field where the wellbore is drilled.

In some implementations, once a command is generated, the command is transferred downhole through a coder-decoder pair while a drive system executes the command. Specific multi-dimensional color coding can be used to show changes in fluid saturation. Auto-pilot steering can seek fluid saturation image profile through bi-directional communication between the computer system and the downhole processor through wired drill pipe or mud pulses telemetry. In some cases, on the rig floor, a unit such as a downlink commander can interface between engineers who operate the unit and downhole logging-while-drilling (LWD) tools. The unit can operate by changing mud pressure to create binary code (e.g., mud pulse telemetry) in both directions, by sending commands to the downhole LWD tools from the surface and receiving confirmation command being received and executed by the downhole LWD tools. In some cases, for high-speed data transmission through a high-bandwidth medium such as wired drill pipe, commands can be sent through the high-bandwidth medium. Changing mud pressure to generate mud pulse telemetry may not need to be performed.

Figure 2:
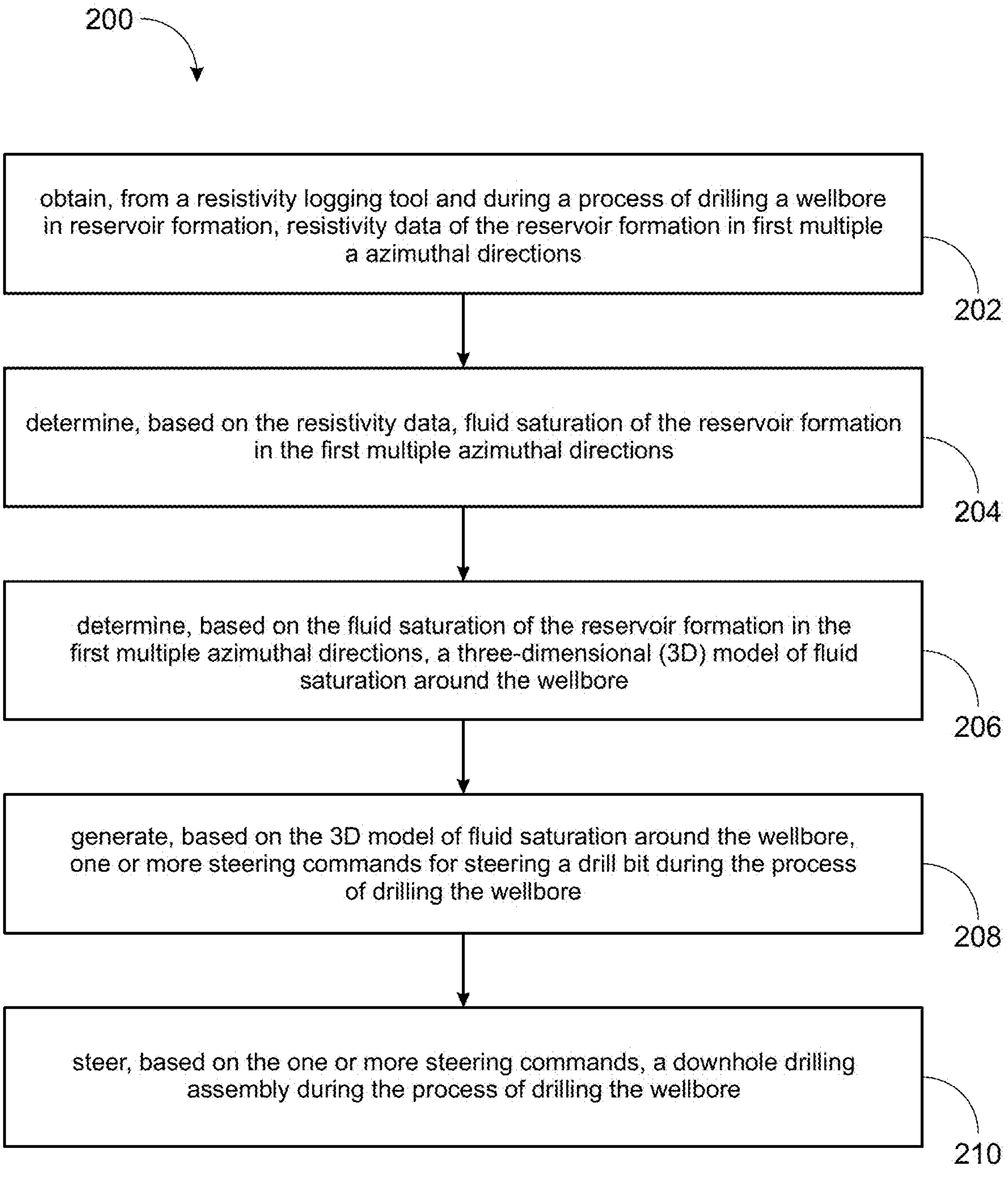
FIG. 2 illustrates an example process for well steering by estimating wellbore fluid saturation distribution, according to some implementations.

FIG. 2 illustrates an example process 200 for an example process for well steering by estimating wellbore fluid saturation distribution, according to some implementations. For convenience, process 200 will be described as being performed by a computer system having one or more computers located in one or more locations and programmed appropriately in accordance with this specification. An example of the computer system is the computer system 300 illustrated in FIG. 3.

At 202, a computer system obtains, from a resistivity logging tool and during a process of drilling a wellbore in a reservoir formation, resistivity data of the reservoir formation in a first multiple azimuthal directions.

At 204, the computer system determines, based on the resistivity data, fluid saturation of the reservoir formation in the first multiple azimuthal directions.

At 206, the computer system determines, based on the fluid saturation of the reservoir formation in the first multiple azimuthal directions, a three-dimensional (3D) model of fluid saturation around the wellbore.

At 208, the computer system generates, based on the 3D model of fluid saturation around the wellbore, one or more steering commands for steering a drill bit during the process of drilling the wellbore.

At 210, the computer system steers, based on the one or more steering commands, a downhole drilling assembly during the process of drilling the wellbore.

Figure 3:
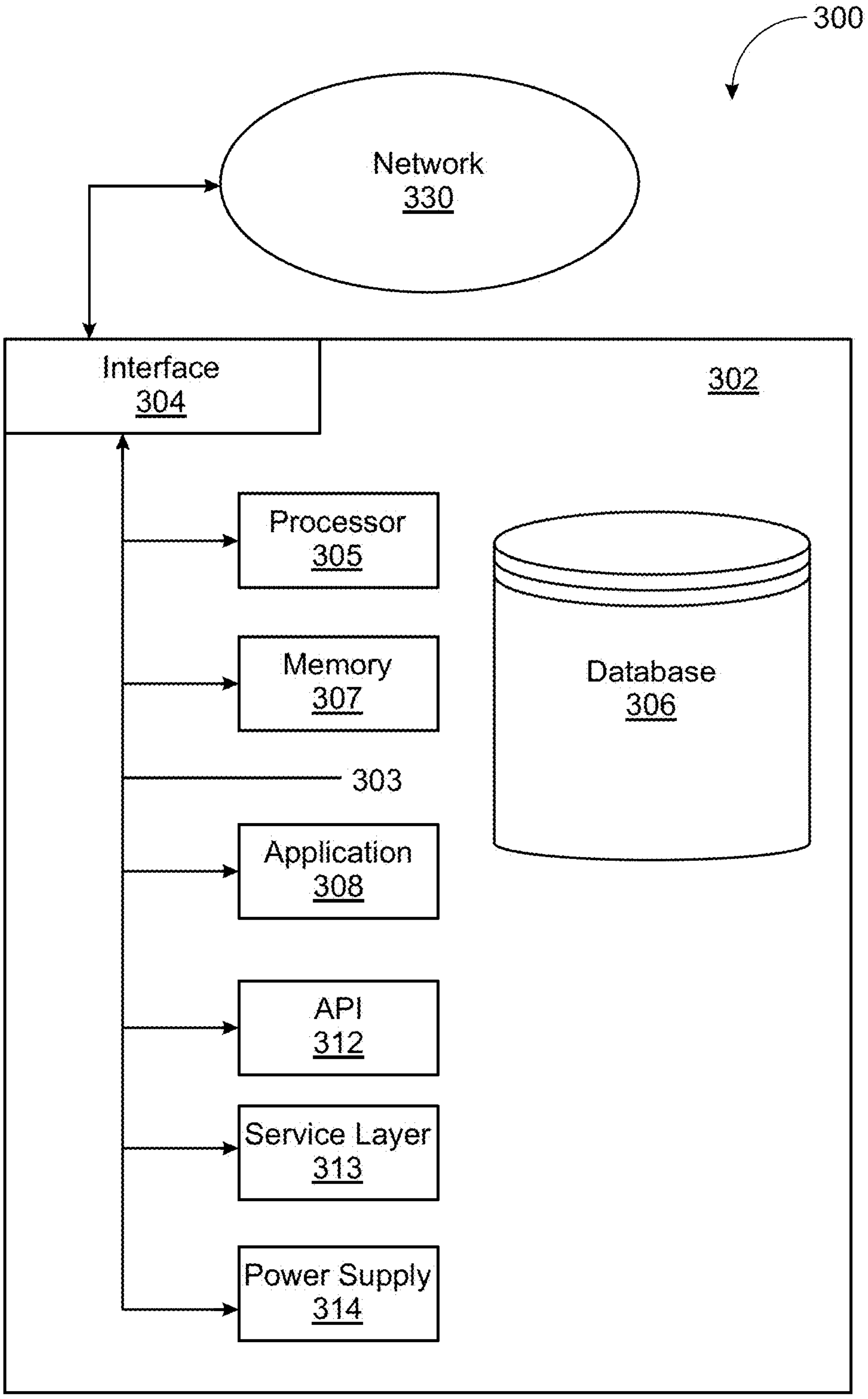
FIG. 3 is a block diagram of an example computer system that can be used to provide computational functionalities associated with described algorithms, methods, functions, processes, flows, and procedures, according to some implementations.

FIG. 3 is a block diagram of an example computer system 300 that can be used to provide computational functionalities associated with described algorithms, methods, functions, processes, flows, and procedures, according to some implementations of the present disclosure. In some implementations, the computer system performing process 100 or 200 can be the computer system 300, include the computer system 300, or the computer system performing process 100 or 200 can communicate with the computer system 300.

The illustrated computer 302 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 302 can include a Smart Embedded Management Agent (SEMA), such as a built-in ADLINK SEMA 2.2, and a video sync technology, such as Quick Sync Video technology supported by ADLINK MSDK+. In some examples, the computer 302 can include the MXE-5400 Series processor-based fanless embedded computer by ADLINK, though the computer 302 can take other forms or include other components.

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a high level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both), over the system bus. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs 312.

The service layer 313 can provide software services to the computer 302 and other components (whether illustrated or not) that are communicably coupled to the computer 302. The functionality of the computer 302 can be accessible for all service consumers using this service layer 313. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 can include an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and manipulate data to perform the operations of the computer 302, including operations using algorithms, methods, functions, processes, flows, and procedures as described in the present disclosure.

The computer 302 can also include a database 306 that can hold data for the computer 302 and other components connected to the network 330 (whether illustrated or not). For example, database 306 can be an in-memory, conventional, or a database storing data consistent with the present disclosure. In some implementations, the database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

An application 308 can be an algorithmic software engine providing functionality according to particular needs, desires, or particular implementations of the computer 302 and the described functionality. For example, an application 308 can serve as one or more components, modules, or applications 308. Multiple applications 308 can be implemented on the computer 302. Each application 308 can be internal or external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system including computer 302, with each computer 302 communicating over network 330. Further, the terms "client", "user", and other appropriate terminology can be used interchangeably without departing from the scope of the present disclosure. Moreover, the present disclosure contemplates that many users can use one computer 302 and one user can use multiple computers 302.

Figure 4:
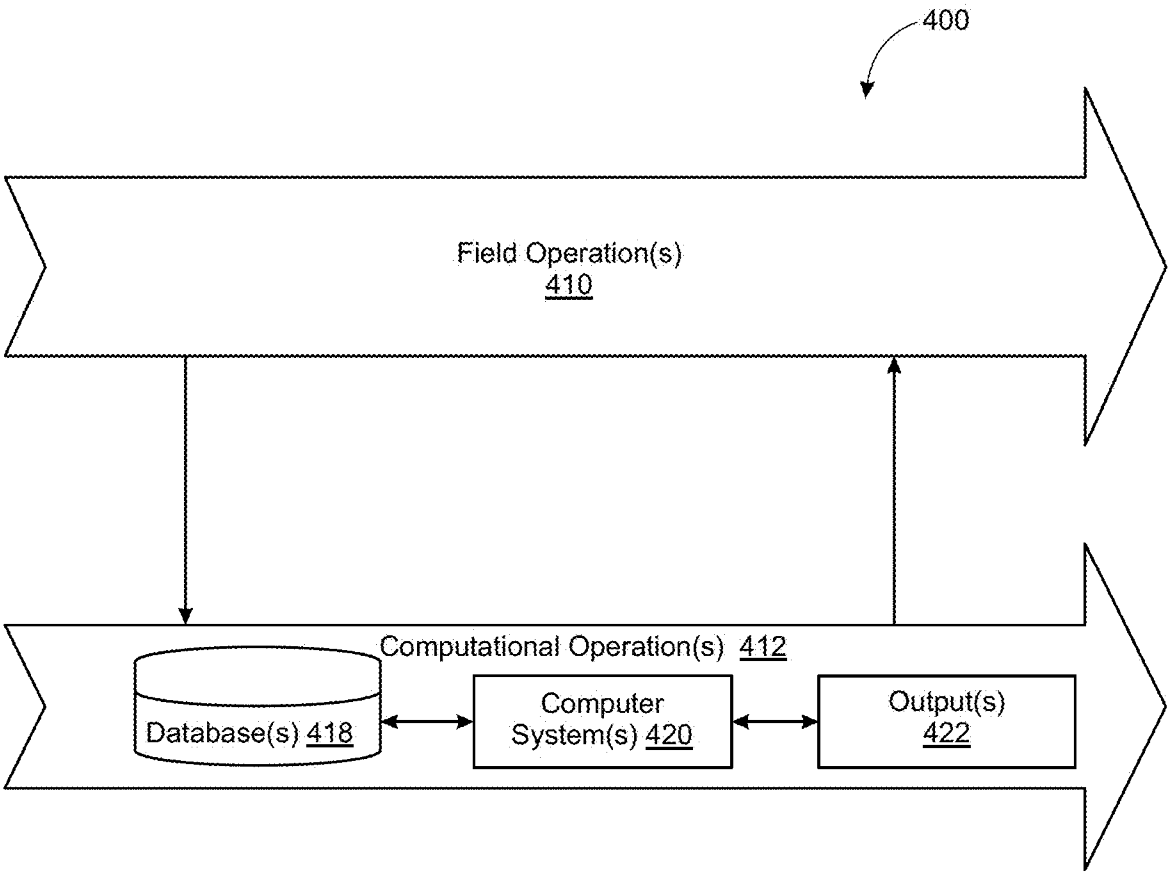
FIG. 4 illustrates hydrocarbon production operations that include both one or more field operations and one or more computational operations, which exchange information and control exploration for the production of hydrocarbons, according to some implementations.

FIG. 4 illustrates hydrocarbon production operations 400 that include both one or more field operations 410 and one or more computational operations 412, which exchange information and control exploration for the production of hydrocarbons. In some implementations, outputs of techniques of the present disclosure can be performed before, during, or in combination with the hydrocarbon production operations 400, specifically, for example, either as field operations 410 or computational operations 412, or both.

Examples of field operations 410 include forming/drilling a wellbore, hydraulic fracturing, producing through the wellbore, injecting fluids (such as water) through the wellbore, to name a few. In some implementations, methods of the present disclosure can trigger or control the field operations 410. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 410 and responsively triggering the field operations 410 including, for example, generating plans and signals that provide feedback to and control physical components of the field operations 410. Alternatively or in addition, the field operations 410 can trigger the methods of the present disclosure. For example, implementing physical components (including, for example, hardware, such as sensors) deployed in the field operations 410 can generate plans and signals that can be provided as input or feedback (or both) to the methods of the present disclosure.

Examples of computational operations 412 include one or more computer systems 420 that include one or more processors and computer-readable media (e.g., non-transitory computer-readable media) operatively coupled to the one or more processors to execute computer operations to perform the methods of the present disclosure. The computational operations 412 can be implemented using one or more databases 418, which store data received from the field operations 410 and/or generated internally within the computational operations 412 (e.g., by implementing the methods of the present disclosure) or both. For example, the one or more computer systems 420 process inputs from the field operations 410 to assess conditions in the physical world, the outputs of which are stored in the databases 418. For example, seismic sensors of the field operations 410 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 412 where they are stored in the databases 418 and analyzed by the one or more computer systems 420.

In some implementations, one or more outputs 422 generated by the one or more computer systems 420 can be provided as feedback/input to the field operations 410 (either as direct input or stored in the databases 418). The field operations 410 can use the feedback/input to control physical components used to perform the field operations 410 in the real world.

For example, the computational operations 412 can process the seismic data to generate three-dimensional (3D) maps of the subsurface formation. The computational operations 412 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 412 to process new information about the formation and control the drilling to adjust to the observed conditions in real-time.

The one or more computer systems 420 can update the 3D maps of the subsurface formation as information from one exploration well is received and the computational operations 412 can adjust the location of the next exploration well based on the updated 3D maps. Similarly, the data received from production operations can be used by the computational operations 412 to control components of the production operations. For example, production well and pipeline data can be analyzed to predict slugging in pipelines leading to a refinery and the computational operations 412 can control machine operated valves upstream of the refinery to reduce the likelihood of plant disruptions that run the risk of taking the plant offline.

In some implementations of the computational operations 412, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s.

While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms “data processing apparatus”, “computer”, and “electronic computer device” (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/-R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser. Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

EMBODIMENTS

Embodiment 1: A computer-implemented method comprising: obtaining, from a resistivity logging tool and during a process of drilling a wellbore in a reservoir formation, resistivity data of the reservoir formation in a first plurality of azimuthal directions; determining, based on the resistivity data, fluid saturation of the reservoir formation in the first plurality of azimuthal directions; determining, based on the fluid saturation of the reservoir formation in the first plurality of azimuthal directions, a three-dimensional (3D) model of fluid saturation around the wellbore; generating, based on the 3D model of fluid saturation around the wellbore, one or more steering commands for steering a drill bit during the process of drilling the wellbore; and steering, based on the one or more steering commands, a downhole drilling assembly during the process of drilling the wellbore.

Embodiment 2: The computer-implemented method of embodiment 1, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

Embodiment 3: The computer-implemented method of embodiment 2, wherein determining the fluid saturation of the reservoir formation in the first plurality of azimuthal directions comprises: determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

Embodiment 4: The computer-implemented method of embodiment 3, wherein determining lithology and porosity of the reservoir formation comprises: determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

Embodiment 5: The computer-implemented method of any one of embodiments 1 to 4, wherein determining the fluid saturation of the reservoir formation in the first plurality of azimuthal directions comprises performing a geostatistical interpolation processing on the fluid saturation to transform the fluid saturation from one dimension to two dimensions.

Embodiment 6: The computer-implemented method of any one of embodiments 1 to 5, wherein the resistivity data is with respect to a plurality of depths of investigation (DOI).

Embodiment 7: The computer-implemented method of any one of embodiments 1 to 6, wherein obtaining the resistivity data comprises obtaining the resistivity data through a high-bandwidth data transmission medium, wherein a bandwidth of the high-bandwidth data transmission medium is at least 56k bits per second.

Embodiment 8: The computer-implemented method of any one of embodiments 1 to 7, wherein steering the downhole drilling assembly comprises sending the one or more steering commands to the downhole drilling assembly to steer the downhole drilling assembly.

Embodiment 9: A non-transitory computer-readable medium storing one or more instructions executable by a computer system to perform operations comprising: obtaining, from a resistivity logging tool and during a process of drilling a wellbore in a reservoir formation, resistivity data of the reservoir formation in a first plurality of azimuthal directions; determining, based on the resistivity data, fluid saturation of the reservoir formation in the first plurality of azimuthal directions; determining, based on the fluid saturation of the reservoir formation in the first plurality of azimuthal directions, a three-dimensional (3D) model of fluid saturation around the wellbore; generating, based on the 3D model of fluid saturation around the wellbore, one or more steering commands for steering a drill bit during the process of drilling the wellbore; and steering, based on the one or more steering commands, a downhole drilling assembly during the process of drilling the wellbore.

Embodiment 10: The non-transitory computer-readable medium of embodiment 9, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

Embodiment 11: The non-transitory computer-readable medium of embodiment 10, wherein determining the fluid saturation of the reservoir formation in the first plurality of azimuthal directions comprises: determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

Embodiment 12: The non-transitory computer-readable medium of embodiment 11, wherein determining lithology and porosity of the reservoir formation comprises: determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

Embodiment 13: The non-transitory computer-readable medium of any one of embodiments 9 to 12, wherein determining the fluid saturation of the reservoir formation in the first plurality of azimuthal directions comprises performing a geostatistical interpolation processing on the fluid saturation to transform the fluid saturation from one dimension to two dimensions.

Embodiment 14: The non-transitory computer-readable medium of any one of embodiments 9 to 13, wherein the resistivity data is with respect to a plurality of depths of investigation (DOI).

Embodiment 15: A computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising: obtaining, from a resistivity logging tool and during a process of drilling a wellbore in a reservoir formation, resistivity data of the reservoir formation in a first plurality of azimuthal directions; determining, based on the resistivity data, fluid saturation of the reservoir formation in the first plurality of azimuthal directions; determining, based on the fluid saturation of the reservoir formation in the first plurality of azimuthal directions, a three-dimensional (3D) model of fluid saturation around the wellbore; generating, based on the 3D model of fluid saturation around the wellbore, one or more steering commands for steering a drill bit during the process of drilling the wellbore; and steering, based on the one or more steering commands, a downhole drilling assembly during the process of drilling the wellbore.

Embodiment 16: The computer-implemented system of embodiment 15, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

Embodiment 17: The computer-implemented system of embodiment 16, wherein determining the fluid saturation of the reservoir formation in the first plurality of azimuthal directions comprises: determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

Embodiment 18: The computer-implemented system of embodiment 17, wherein determining lithology and porosity of the reservoir formation comprises: determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

Embodiment 19: The computer-implemented system of any one of embodiments 15 to 18, wherein determining the fluid saturation of the reservoir formation in the first plurality of azimuthal directions comprises performing a geostatistical interpolation processing on the fluid saturation to transform the fluid saturation from one dimension to two dimensions.

Embodiment 20: The computer-implemented system of any one of embodiments 15 to 19, wherein the resistivity data is with respect to a plurality of depths of investigation (DOI).

What is claimed is:

1. A computer-implemented method, comprising:

obtaining, from a resistivity logging tool and at a plurality of time points during a process of drilling a wellbore in a reservoir formation, resistivity data of the reservoir formation in a first plurality of azimuthal directions, the resistivity data being indicative of types of formation fluid in a pore space;

determining, based on the resistivity data, fluid saturation of the reservoir formation in the first plurality of azimuthal directions distributed across a plurality of radial layers at different distances from the wellbore;

generating, based on the fluid saturation of the reservoir formation in the first plurality of azimuthal directions and by radially interpolating-the fluid saturation between the plurality of radial layers to characterize fluid distribution at varying radial distances from the wellbore, a three-dimensional (3D) model of fluid saturation along and around the wellbore, the 3D model of fluid saturation comprising a real time characterization of fluid dynamics of each type of the types of formation fluid in the pore space, for each of the plurality of time points;

generating, based on the 3D model of fluid saturation around the wellbore, one or more steering commands for steering a drill bit during the process of drilling the wellbore; and steering, using the one or more steering commands, a downhole drilling assembly during the process of drilling the wellbore.

2. The computer-implemented method of claim 1, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

3. The computer-implemented method of claim 2, wherein determining the fluid saturation of the reservoir formation in the first plurality of azimuthal directions comprises:

determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

4. The computer-implemented method of claim 3, wherein determining lithology and porosity of the reservoir formation comprises:

determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

5. The computer-implemented method of claim 1, wherein determining the fluid saturation of the reservoir formation in the first plurality of azimuthal directions comprises performing a geostatistical interpolation processing on the fluid saturation to transform the fluid saturation from a unidimensional representation to a two dimensional array comprising the first plurality of azimuthal directions.

6. The computer-implemented method of claim 1, wherein the resistivity data is with respect to a plurality of depths of investigation (DOI).

7. The computer-implemented method of claim 1, wherein obtaining the resistivity data comprises obtaining the resistivity data through a high-bandwidth data transmission medium, wherein a bandwidth of the high-bandwidth data transmission medium is at least 56k bits per second.

8. The computer-implemented method of claim 1, wherein steering the downhole drilling assembly comprises sending the one or more steering commands to the downhole drilling assembly to steer the downhole drilling assembly.

9. A non-transitory computer-readable medium storing one or more instructions executable by a computer system to perform operations comprising:

obtaining, from a resistivity logging tool and at a plurality of time points during a process of drilling a wellbore in a reservoir formation, resistivity data of the reservoir formation in a first plurality of azimuthal directions, the resistivity data being indicative of types of formation fluid in a pore space;

determining, based on the resistivity data, fluid saturation of the reservoir formation in the first plurality of azimuthal directions distributed across a plurality of radial layers at different distances from the wellbore;

generating, based on the fluid saturation of the reservoir formation in the first plurality of azimuthal directions and by radially interpolating-the fluid saturation between the plurality of radial layers to characterize fluid distribution at varying radial distances from the wellbore, a three-dimensional (3D) model of fluid saturation along and around the wellbore, the 3D model of fluid saturation comprising a real time characterization of fluid dynamics of each type of the types of formation fluid in the pore space, for each of the plurality of time points;

generating, based on the 3D model of fluid saturation around the wellbore, one or more steering commands for steering a drill bit during the process of drilling the wellbore; and steering, using the one or more steering commands, a downhole drilling assembly during the process of drilling the wellbore.

10. The non-transitory computer-readable medium of claim 9, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

11. The non-transitory computer-readable medium of claim 10, wherein determining the fluid saturation of the reservoir formation in the first plurality of azimuthal directions comprises:

determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

12. The non-transitory computer-readable medium of claim 11, wherein determining lithology and porosity of the reservoir formation comprises:

determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

13. The non-transitory computer-readable medium of claim 9, wherein determining the fluid saturation of the reservoir formation in the first plurality of azimuthal directions comprises performing a geostatistical interpolation processing on the fluid saturation to transform the fluid saturation from a unidimensional representation to a two dimensional array comprising the first plurality of azimuthal directions.

14. The non-transitory computer-readable medium of claim 9, wherein the resistivity data is with respect to a plurality of depths of investigation (DOI).

15. A computer-implemented system comprising:

one or more computers; and one or more computer memory devices interoperably coupled with the one or more computers and having tangible, non-transitory, machine-readable media storing one or more instructions that, when executed by the one or more computers, cause the computer-implemented system to perform one or more operations comprising:

obtaining, from a resistivity logging tool and at a plurality of time points during a process of drilling a wellbore in a reservoir formation, resistivity data of the reservoir formation in a first plurality of azimuthal directions, the resistivity data being indicative of types of formation fluid in a pore space;

determining, based on the resistivity data, fluid saturation of the reservoir formation in the first plurality of azimuthal directions distributed across a plurality of radial layers at different distances from the wellbore;

generating, based on the fluid saturation of the reservoir formation in the first plurality of azimuthal directions and by radially interpolating—the fluid saturation between the plurality of radial layers to characterize fluid distribution at varying radial distances from the wellbore, a three-dimensional (3D) model of fluid saturation along and around the wellbore, the 3D model of fluid saturation comprising a real time characterization of fluid dynamics of each type of the types of formation fluid in the pore space, for each of the plurality of time points;

generating, based on the 3D model of fluid saturation around the wellbore, one or more steering commands for steering a drill bit during the process of drilling the wellbore; and steering, using the one or more steering commands, a downhole drilling assembly during the process of drilling the wellbore.

16. The computer-implemented system of claim 15, wherein obtaining the resistivity data comprises obtaining the resistivity data and at least one of density data of the reservoir formation in a second plurality of azimuthal directions, photoelectric (PE) factor data of the reservoir formation in a third plurality of azimuthal directions, gamma ray (GR) data of the reservoir formation in a fourth plurality of azimuthal directions, or porosity indicator data of the reservoir formation converted from total neutron count.

17. The computer-implemented system of claim 16, wherein determining the fluid saturation of the reservoir formation in the first plurality of azimuthal directions comprises:

determining, as a determined lithology and porosity of the reservoir formation and based on the resistivity data and the at least one of density data, PE factor data, GR data, or porosity indicator data, lithology and porosity of the reservoir formation; and determining, based on the determined lithology and porosity of the reservoir formation, the fluid saturation of the reservoir formation in the first plurality of azimuthal directions.

18. The computer-implemented system of claim 17, wherein determining lithology and porosity of the reservoir formation comprises:

determining, based on at least one of a plurality of density-neutron cross-plots, a plurality of volume of shale equations, or a plurality of fluid saturation equations, the lithology and the porosity of the reservoir formation; or determining, based on a multi-mineral analysis of the resistivity data and the at least one of density data, PE factor data, GR data, or porosity indicator data, the lithology and the porosity of the reservoir formation.

19. The computer-implemented system of claim 15, wherein determining the fluid saturation of the reservoir formation in the first plurality of azimuthal directions comprises performing a geostatistical interpolation processing on the fluid saturation to transform the fluid saturation from a unidimensional representation to a two dimensional array comprising the first plurality of azimuthal directions.

20. The computer-implemented system of claim 15, wherein the resistivity data is with respect to a plurality of depths of investigation (DOI).

* * * * *